(12) United States Patent
Luschi et al.

(10) Patent No.: US 8,787,842 B2
(45) Date of Patent: Jul. 22, 2014

(54) METHOD USING DIFFERENTIALLY ENCODED FEEDBACK INFORMATION IN PRECODED MIMO-OFDM SYSTEMS

(75) Inventors: Carlo Luschi, Oxford (GB); Tarik Tabet, Ashtead (GB); Steve Allpress, Bristol (GB)

(73) Assignee: Icera Inc., Wilmington, DE (US)

( * ) Notice: Subject to any disclaimer, the term of this patent is extended or adjusted under 35 U.S.C. 154(b) by 650 days.

(21) Appl. No.: 12/812,362

(22) PCT Filed: Jan. 8, 2009

(86) PCT No.: PCT/EP2009/050184
§ 371 (c)(1),
(2), (4) Date: Nov. 12, 2010

(87) PCT Pub. No.: WO2009/087198
PCT Pub. Date: Jul. 16, 2009

(65) Prior Publication Data
US 2011/0045783 A1 Feb. 24, 2011

(30) Foreign Application Priority Data

Jan. 9, 2008 (GB) .................................. 0800366.7
Feb. 1, 2008 (GB) .................................. 0802029.9
Mar. 31, 2008 (GB) .................................. 0805813.3

(51) Int. Cl.
| | | |
|---|---|---|
| *H04B 1/00* | (2006.01) | |
| *H04B 7/00* | (2006.01) | |
| *H04W 16/28* | (2009.01) | |
| *H04L 25/03* | (2006.01) | |
| *H04L 1/00* | (2006.01) | |
| *H04L 1/06* | (2006.01) | |

(52) U.S. Cl.
CPC ........ *H04L 25/03343* (2013.01); *H04L 1/0029* (2013.01); *H04L 1/0631* (2013.01); *H04L 2025/03414* (2013.01); *H04L 2025/03808* (2013.01)
USPC .......................................................... 455/69

(58) Field of Classification Search
USPC ............................................................ 455/69
See application file for complete search history.

(56) References Cited

U.S. PATENT DOCUMENTS 6,236,687 B1 * 5/2001 Caso et al. ..................... 375/327
7,881,247 B2 2/2011 Pan et al.
(Continued)

FOREIGN PATENT DOCUMENTS

EP 1919098 A1 5/2005
JP 2008-125068 A 5/2008
(Continued)

OTHER PUBLICATIONS

Efficient Feedback Design for MIMO SC-FDMA Systems; Jung-Lin Pan, et al.; p. 2399-2403; 2007 IEEE.
Further discussion on the differential feedback of PMI for LTE Downlink Closed-Loop MIMO; Aug. 20-24, 2007; 5 pages.
SU-MIMO PMI feedback and Compression; Oct. 8-12, 2007; 5 pages.

(Continued)

*Primary Examiner* — Temesgh Ghebretinsae
*Assistant Examiner* — Devan Sandiford

(57) ABSTRACT

A method, program and system for transmitting from a transmitter to a receiver over a wireless multiple-input-multiple-output channel. In one aspect, the method may comprise encoding precoding information fed back from the receiver to the transmitter according to a differential encoding scheme, and resetting the differential encoding scheme upon detecting a condition. In another aspect, the method may comprises encoding precoding matrices fed back from the receiver to the transmitter relative to a most-probable subset of precoding matrices. In another aspect, the method may comprise transmitting an indication of and/or the size of a preferred subset of precoding matrices for use in the encoding.

34 Claims, 4 Drawing Sheets

(56) References Cited

U.S. PATENT DOCUMENTS

2003/0201932 A1* 10/2003 Rabinowitz et al. ..... 342/357.09
2006/0150049 A1* 7/2006 Zhang et al. ................. 714/746
2009/0219838 A1* 9/2009 Jia et al. ........................ 370/278

FOREIGN PATENT DOCUMENTS

| | | |
|---|---|---|
| JP | 2010-501136 A | 1/2010 |
| WO | 2007106980 A1 | 9/2007 |
| WO | 2007121568 A1 | 11/2007 |
| WO | 2008021396 A2 | 2/2008 |
| WO | 2008154201 A2 | 12/2008 |
| WO | 2009087198 A2 | 7/2009 |

OTHER PUBLICATIONS

D. Love and R. W. Heath, "Limited Feedback Precoding for Spatial Multiplexing Systems", In Proc. IEEE Globecom 2003, pp. 1857-1861.

"Way Forward for MU-MIMO Design," 3GPP TSG RAN WG1 Meeting #49bis, R1-073100, Samsung, Jun. 25-29, 2007, 4 pages, Orlando, Florida.

"Further discussion on the differential feedback of PMI for LTE Downlink Closed-Loop MIMO," 3GPP TSG-RAN Working Group 1 Meeting #50, R1-073292, Nortel, Aug. 20-24, 2007, 5 pages, Athens, Greece.

Translation of Japanese office action dated Dec. 17, 2013, Application No. 2010-541786, 5 pages.

* cited by examiner

METHOD USING DIFFERENTIALLY ENCODED FEEDBACK INFORMATION IN PRECODED MIMO-OFDM SYSTEMS

CROSS-REFERENCE TO RELATED APPLICATIONS

This application is the National Stage of, and therefore claims the benefit of, International Application No. PCT/EP2009/050184 filed on Jan. 8, 2009, entitled "SYSTEM AND METHOD OF WIRELESS COMMUNICATION," which was published in English under International Publication Number WO 2009/087198 on Jul. 16, 2009, and has a priority date of Jan. 9, 2008, based on the application GB 0800366.7, and also claims priority from GB 0802029.9 filed on Feb. 1, 2008 and GB 0805813.3 filed on Mar. 31, 2008. The above applications are commonly assigned with this National Stage application and are incorporated herein by reference in their entirety.

FIELD OF THE INVENTION

The present invention relates to the feedback of precoding information in Multiple-Input-Multiple-Output (MIMO) systems.

BACKGROUND

MIMO refers to the use of multiple transmit antennas and multiple receive antennas for the transmission of a signal in order to improve performance. A highly schematised block diagram of a MIMO system is shown in FIG. 1. The system comprises a transmitter 2 having multiple antennas $6(1) \ldots 6(n)$ and a receiver 4 having multiple antennas $8(1) \ldots 8(m)$. For example, the transmitter may be a base station and the receiver may be a mobile terminal of a cellular communication system. The transmitter 2 transmits a signal on each of its antennas 6, and the receiver 4 receives the signal on each of its antennas 8. To achieve good closed-loop performance, the transmitter may perform MIMO "precoding", which needs channel information to determine the relative amplitude and phase with which to transmit the signal on each antenna.

To obtain the closed-loop capacity of a MIMO system, channel state information is required at the transmitter. In general, this information has to be fed back from the receiver 4. To reduce the amount of feedback overhead, a precoding matrix approach was proposed in D. Love and R. W. Heath, "Limited Feedback Precoding for Spatial Multiplexing Systems", in Proc. IEEE Globecom 2003, pp. 1857-1861. The basic idea behind this approach is to quantize the MIMO channel using a codebook consisting of a set of pre-defined matrices. For each channel realization, the receiver finds the best (according to some performance criteria) precoding matrix from the codebook shared between the receiver and the transmitter, and then feeds only the index of this matrix to the transmitter.

In a closed-loop MIMO-OFDM system, information on the best precoding matrix is provided to the base station transmitter through a precoding matrix indicator (PMI) corresponding to the actual channel, which is reported by the UE per group of sub-bands, where a sub-band is a predefined frequency resource.

To reduce the amount of signalling overhead required for the feedback, different compression schemes have been proposed in conjunction with the precoding approach. These schemes rely on the correlation in time or frequency (for the case of MIMO-OFDM system) of the channel. In other words, compression exploits the fact that the sequence of the channel precoding matrices is correlated. Consider for example the case of a scheme based on differential encoding, where only the offset of the precoding matrix index is sent instead of the index itself. The offset is computed from the subset of precoding matrices that are highly correlated with the initial precoding matrix. The correlation can be based on different metrics, including inner product, distance metrics, or other metrics.

However, although such encoding schemes reduce signalling overhead, they are also prone to error. Particularly, differential encoding schemes are prone to propagation of error.

SUMMARY OF THE INVENTION

According to one aspect of the present invention, there is provided a method comprising: transmitting from a transmitter to a receiver over a wireless multiple-input-multiple-output channel, encoding precoding information fed back from the receiver to the transmitter according to a differential encoding scheme, and resetting the differential encoding scheme upon detecting a condition.

For example, the transmitter (e.g. base station) transmits to a receiver (e.g. UE) over a wireless multiple-input-multiple-output channel using a precoding matrix selected from a precoding codebook. The selection of the precoding matrix is based on the precoding matrix indicator feedback from the UE receiver. The overhead of this PMI feedback is reduced using a differential encoding scheme (which means that the preferred precoding matrix index is signalled with respect to a subset of the precoding codebook).

According to another aspect of the invention, there is provided:

a method of transmitting from a transmitter to a receiver over a wireless multiple-input-multiple-output channel comprising a series of frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and for each successive frequency interval in the series:

determining from said predetermined set of precoding matrices a preferred subset of precoding matrices based on a suitable metric computed with respect to the matrix determined for the previous frequency interval;

based on one or more performance criteria evaluated in relation to the previously received transmission, selecting at the receiver a respective precoding matrix from said predetermined set for transmitting from the transmitter to the receiver on said successive frequency interval; and feeding back an index of that respective precoding matrix from the receiver to the transmitter using a differential encoding scheme whereby the respective index is indicated relative to said preferred subset;

wherein the method further comprises resetting the differential encoding scheme upon detecting a condition.

By resetting the differential encoding during a sequence of live transmissions, during the ongoing operation of the transmitter and receiver system, then propagation of errors due to the differential encoding scheme is reduced.

The determining based on said suitable metric preferably comprises determining a subset of matrices from said predetermined set having the greatest correlation with the first matrix.

For each frequency interval, the method may comprise transmitting from the transmitter to the receiver using the respective precoding matrix to transmit on said successive frequency interval. The transmitter (e.g. base station) may use the matrix index fed back from the receiver (e.g. UE) only as a possibility—in other words there is possibility for the transmitter to overrule the feedback (based on other information/constraints).

For each transmission, the method may comprise feeding back an index of the first precoding matrix from the receiver to the transmitter, and transmitting from the transmitter to the receiver using the first precoding matrix to transmit on the first frequency interval.

In one embodiment: for each of said successive frequency intervals, the method comprises determining from said predetermined set, separately from the determination of said preferred subset, a subset of most-probable precoding matrices having some conditional probability of being selected for transmission.

Said condition may be that the most-probable subset differs from the preferred subset by a predetermined amount. Said condition may be that the selected precoding matrix is not in the preferred subset. Said condition may be that a periodic time has elapsed.

Said resetting may comprise replacing the preferred subset with the most-probable subset. Said resetting may comprise indicating the respective index relative to the whole of said predetermined set.

Preferably, said determination of said most-probable precoding matrices is based on calculation during the actual system operation.

According to a further aspect of the present invention, there is provided a method comprising: transmitting from a transmitter to a receiver over a wireless multiple-input-multiple-output channel, and encoding precoding matrices fed back from the receiver to the transmitter relative to a most-probable subset of precoding matrices.

Again for example, the transmitter (e.g., base station) transmits to a receiver (e.g., UE) over a wireless multiple-input-multiple-output channel using a precoding matrix selected from a precoding codebook. The selection of the precoding matrix is based on the precoding matrix indicator feedback from the UE receiver. The overhead of this PMI feedback is reduced using a differential encoding scheme (which means that the preferred precoding matrix index is signalled with respect to a subset of the precoding codebook).

According to a further aspect of the invention, there is provided:
a method of transmitting from a transmitter to a receiver over a wireless multiple-input-multiple-output channel comprising a series of frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals;
and for each successive frequency interval in the series:
determining, from said predetermined set of precoding matrices, a subset of most-probable precoding matrices having some conditional probability of being selected for transmission from the transmitter to the receiver;
based on one or more performance criteria evaluated in relation to the previously received transmission, selecting at the receiver a respective precoding matrix from said predetermined set for transmission from the transmitter to the receiver on said successive frequency interval; and
feeding back an index of that respective precoding matrix from the receiver to the transmitter using a differential encoding scheme whereby the respective index is indicated relative to said subset of most-probable precoding matrices.

Preferably said determination of said most-probable precoding matrices is based on calculation during the actual system operation.

According to another aspect of the present invention, there is provided a method comprising: transmitting from a transmitter to a receiver over a wireless multiple-input-multiple-output channel, encoding precoding information fed back from the receiver to the transmitter, and transmitting an indication of and/or the size of a preferred subset of precoding matrices for use in the encoding.

According to another aspect of the invention, there is provided:
a method of transmitting from a transmitter to a receiver over a wireless multiple-input-multiple-output channel comprising a series of frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and
for each successive frequency interval in the series:
determining from said predetermined set of precoding matrices a preferred subset of precoding matrices;
based on one or more performance criteria evaluated in relation to the previously received transmission, selecting at the receiver a respective precoding matrix from said predetermined set for transmitting from the transmitter to the receiver on said successive frequency interval; and
feeding back an index of that respective precoding matrix from the receiver to the transmitter using a differential encoding scheme whereby the respective index is indicated relative to said preferred subset;
wherein the method further comprises transmitting an indication of at least one of the preferred subsets from the receiver to the transmitter.

According to another aspect of the invention, there is provided:
a method of transmitting from a transmitter to a receiver over a wireless multiple-input-multiple-output channel comprising a series of frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and
for each successive frequency interval in the series:
determining from said predetermined set of precoding matrices a preferred subset of precoding matrices;
based on one or more performance criteria evaluated in relation to the previously received transmission, selecting at the receiver a respective precoding matrix from said predetermined set for transmitting from the transmitter to the receiver on said successive frequency interval; and feeding back an index of that respective precoding matrix from the receiver to the transmitter using a differential encoding scheme whereby the respective index is indicated relative to said preferred subset;

wherein the method further comprises transmitting the size of at least one of the preferred subsets from the receiver to the transmitter.

According to another aspect of the invention, there is provided:

a method of transmitting a sequence of transmissions at respective time intervals from a transmitter to a receiver over a wireless multiple-input-multiple-output channel comprising one or more frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and for each successive time interval in the sequence:

determining from said predetermined set of precoding matrices a preferred subset of precoding matrices based on a suitable metric computed with respect to the matrix determined for the previous time interval;

based on one or more performance criteria evaluated in relation to the previously received transmission, selecting at the receiver a respective precoding matrix from said predetermined set for transmitting from the transmitter to the receiver on said successive time interval;

feeding back an index of that respective precoding matrix from the receiver to the transmitter using a differential encoding scheme whereby the respective index is indicated relative to said preferred subset; and wherein the method further comprises resetting the differential encoding scheme upon detecting a condition.

The determining based on said suitable metric preferably comprises determining a subset of matrices from said predetermined set having the greatest correlation with the first matrix.

For each time interval, the method may comprise transmitting from the transmitter to the receiver using the respective precoding matrix to transmit on said successive frequency interval. The transmitter (e.g. base station) may use the matrix index fed back from the receiver (e.g. UE) only as a possibility—in other words there is possibility for the base station to overrule the feedback (based on other information/constraints).

For each transmission, the method may comprise feeding back an index of the first precoding matrix from the receiver to the transmitter, and transmitting from the transmitter to the receiver using the first precoding matrix to transmit at the first time interval.

In one embodiment: for each of said successive time intervals, the method comprises determining from said predetermined set, separately from the determination of said preferred subset, a subset of most-probable precoding matrices having some conditional probability of being selected for transmission.

Said condition may be that the most-probable subset differs from the preferred subset by a predetermined amount. Said condition may be that the selected precoding matrix is not in the preferred subset. Said condition may be that a periodic time has elapsed.

Said resetting may comprise replacing the preferred subset with the most-probable subset. Said resetting may comprise indicating the respective index relative to the whole of said predetermined set.

Preferably, said determination of said most-probable precoding matrices is based on calculation during the actual system operation.

According to a further aspect of the invention, there is provided:

a method of transmitting a sequence of transmissions at respective time intervals from a transmitter to a receiver over a wireless multiple-input-multiple-output channel comprising one or more frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver at a first of said time intervals;

and for each successive time interval in the series:

determining, from said predetermined set of precoding matrices, a subset of most-probable precoding matrices having some conditional probability of being selected for transmission from the transmitter to the receiver;

based on one or more performance criteria evaluated in relation to the previously received transmission in the sequence, selecting at the receiver a respective precoding matrix from said predetermined set for transmission from the transmitter to the receiver on said successive time interval; and feeding back an index of that respective precoding matrix from the receiver to the transmitter using a differential encoding scheme whereby the respective index is indicated relative to said subset of most-probable precoding matrices.

Preferably said determination of said most-probable precoding matrices is based on calculation during the actual system operation.

According to another aspect of the invention, there is provided:

a method of transmitting a sequence of transmissions at respective time intervals from a transmitter to a receiver over a wireless multiple-input-multiple-output channel comprising one or more frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and for each successive time interval in the sequence:

determining from said predetermined set of precoding matrices a preferred subset of precoding matrices;

based on one or more performance criteria evaluated in relation to the previously received transmission, selecting at the receiver a respective precoding matrix from said predetermined set for transmitting from the transmitter to the receiver on said successive time interval; and feeding back an index of that respective precoding matrix from the receiver to the transmitter using a differential encoding scheme whereby the respective index is indicated relative to said preferred subset;

wherein the method further comprises transmitting an indication of at least one of the preferred subsets from the receiver to the transmitter.

According to another aspect of the invention, there is provided:

a method of transmitting a sequence of transmissions at respective time intervals from a transmitter to a receiver over a wireless multiple-input-multiple-output channel comprising one or more frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and for each successive time interval in the sequence:

determining from said predetermined set of precoding matrices a preferred subset of precoding matrices;

based on one or more performance criteria evaluated in relation to the previously received transmission, selecting at the receiver a respective precoding matrix from said predetermined set for transmitting from the transmitter to the receiver on said successive time interval; and feeding back an index of that respective precoding matrix from the receiver to the transmitter using a differential encoding scheme whereby the respective index is indicated relative to said preferred subset;

wherein the method further comprises transmitting the size of at least one of the preferred subsets from the receiver to the transmitter.

In embodiments, the present invention may also be used in both the time and frequency domains together.

The most-probable subsets may be determined using a finite impulse response filter or an infinite impulse response filter.

According to a further aspect, the present invention provides a computer program product which, when executed by a processor, performs the steps of any of the above methods. According to a further aspect, the present invention provides a receiver comprising multiple antennas and a processor programmed to perform the receiver steps of any of the above methods. According to a further aspect, the present invention provides a transmitter comprising multiple antennas and a processor programmed to perform the transmitter steps of any of the above methods. According to a further aspect, the present invention provides a wireless cellular communication system comprising the transmitter and receiver.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 1:
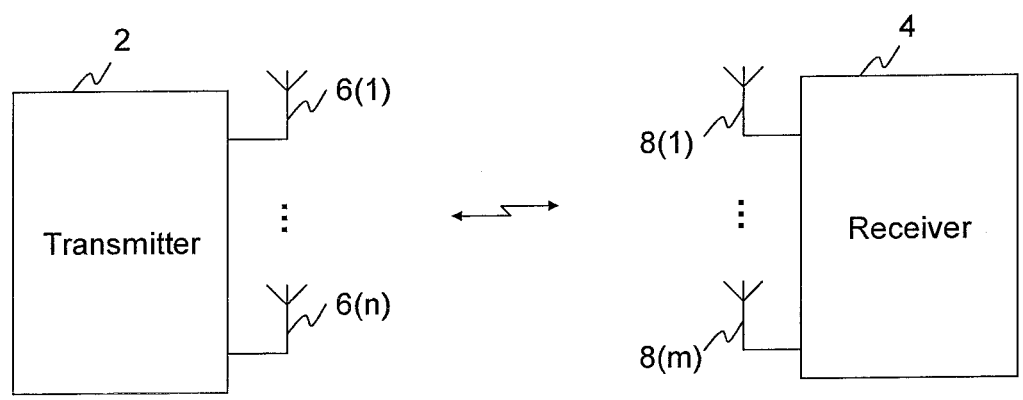
FIG. 1 is a schematic block diagram of a MIMO communications system.
Figure 2:
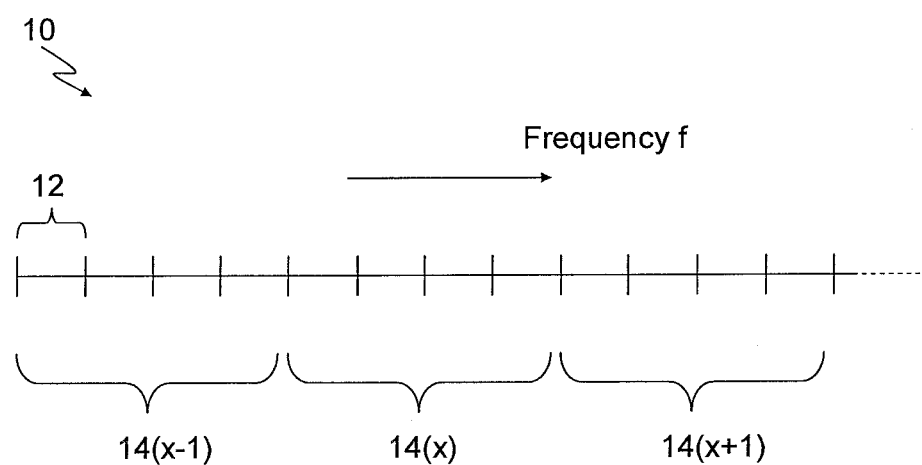
FIG. 2 is a schematic representation of an OFDM channel.

FIG. 1 shows schematically a transmitter 2 and receiver 4. The transmitter 2 transmits signals to the receiver 4 over a wireless MIMO channel. As illustrated schematically in FIG. 2, the channel is an Orthogonal Frequency Division Multiplexing (OFDM) channel comprising a plurality of frequency sub-bands 12, and the sub-bands are grouped together into groups of sub-bands 14. A respective precoding matrix is used for transmission on each group 14, or more generally each frequency interval which could be one or more sub-bands. Each precoding matrix specifies, for its frequency interval, the relative phase and amplitude with which to transmit from the multiple antennas 6 of the transmitter 4.

Figure 3:
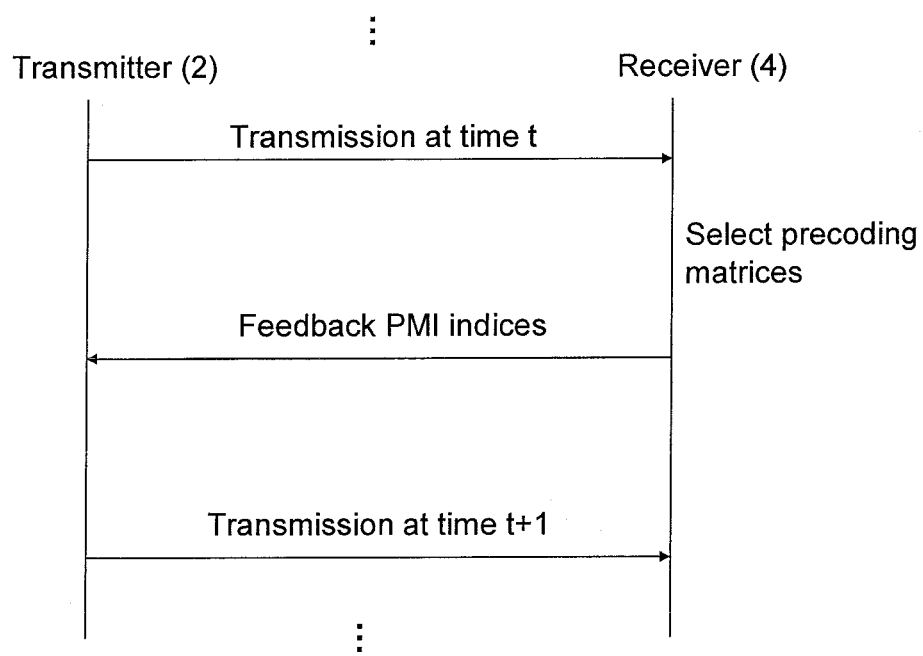
FIG. 3 is a signalling diagram of a MIMO system based on PMI feedback.

However, the precoding matrices required to achieve the best performance on each frequency interval 14 will vary over time with channel conditions. Therefore as illustrated in FIG. 3, the transmitter-receiver system constantly adjusts the precoding matrices using a method of feedback over a series of transmissions. With each transmission at some time t, the receiver determines the optimal matrix to use for each of the respective groups 14 when transmitting the next transmission at time t+1. It does this using any suitable performance criterion or criteria, for example by maximizing throughput or minimizing the mean square error (MSE). The receiver 2 then feeds back the results of this determination to the transmitter 4, by means of the quantity referred to herein as precoding matrix indicator (PMI). As mentioned, the precoding matrices are selected from a predefined set of discrete matrices, or "codebook". The advantage of this is that the results of the reciever's determination can be fed back as an index identifying a particular matrix in the predefined set, rather than having to transmit the actual values of the matrix, which reduces feedback signalling overhead. Using the index to identify the relevant precoding matrices, the transmitter then transmits the next transmission at time t+1 using the newly updated precoding matrices for each respective frequency interval 14.

In fact, to reduce overhead even further, the indices are fed back according to a differential encoding scheme whereby most of the precoding matrices are indicated by relative indices measured relative to an absolute index of one of the other fed back indices. So for example, the indication of the precoding matrix for frequency interval 14(0) of an initial transmission in the series may be fed back as an absolute index, and the indications of the precoding matrices for all of the other transmissions 14(1) ... 14(X) of that signal, and/or the frequency intervals of subsequent transmissions may be fed back as a relative index, relative to that absolute index. This further reduces overhead because the relative index will typically be smaller than an absolute index, and so require fewer bits to encode. For example, if there are sixteen possible precoding matrices then an absolute index will require four bits to encode. But if the precoding matrices for a given series are all within four indices of one another, then a relative index will only require two bits to encode.

However, as mentioned, differential encoding schemes are prone to error propagation. Further, the relative indices could drift away from the original base index. Thus in one embodiment, the present invention resets the base index during an ongoing series of transmission.

By way of example, the performance of downlink closed-loop SU-MIMO with feedback granularity in frequency is considered, e.g. the compression schemes of the following references:

Reference 1: R1-073292, Nortel, "Further discussion on the differential feedback of PMI for LTE downlink closed-loop MIMO", 3GPP TSG-RAN Working Group 1 Meeting #50, Athens, Greece, August 2007; and Reference 2: R1-074087, Samsung, "SU-MIMO PMI feedback and compression", 3GPP TSG-RAN Working Group 1 Meeting #50 bis, Shanghai, China, October 2007.

One important issue is the signaling overhead due to the downlink PMI indication. The latter should be minimized while maintaining a sufficient precoding gain. To reduce the amount of feedback, some different compression schemes have been proposed in conjunction with the precoding approach. These schemes rely on the correlation in time or frequency MIMO-OFDM of the channel.

In References 1 and 2, a differential encoding based compression scheme was used to report PMI for different sub-bands. The main motivation behind this scheme is that the sequence of the channel precoding matrices is correlated over frequency. Assume a codebook C of size L is agreed as the set of precoding matrices. Once the optimal precoding matrix for the initial sub-band is found (optimal with respect to some performance criteria as maximizing throughput or minimizing the MSE), the search for the optimal precoding matrix for the adjacent sub-band can be done on a subset of C of size P, where P<L. Hence the search is less expensive. In the following, we call this subset the differential encoding subset. Assuming that the sequence of the channel precoding matrices is correlated over the frequency, the subset of precoding matrices contains the matrices that are the most correlated with the initial precoding matrix. For each precoding matrix i, a subset $\Gamma_i$ containing the P most correlated precoding matrices with i is set. The correlation is computed as the inner product between two precoding matrices as: $<M_i,M_j> = \sqrt{Tr(M_j^*M_iM_i^*M_j)}$, where Tr(A) denotes the trace of the matrix A. Therefore, only the offset of the precoding matrix index is sent instead of the index itself. If the initial precoding matrix requires $\log_2(L)$ bits to be encoded, all the adjacent sub-bands need only $\log_2(P)$ bits.

For example, consider a case where the receiver determines that the precoding matrix for transmission on the first frequency interval 14(0) is the matrix with an absolute index of 0. For the adjacent frequency interval 14(1), the receiver may then determine that the subset of matrices corresponding to absolute indices 0, 5, 6 and 15 are most correlated with the precoding index of the first interval 14(0). The correlation is preferably determined by the receiver by reference to a look-up table, which is also known to the transmitter. In this particular case, no signaling of the codebook subset is needed. If the receiver also determines that the precoding matrix for transmission on the adjacent second frequency interval 14(1) is the matrix with an absolute index of 6 for example, then it can encode that index for feedback as a relative index as an indication of one of the four possible matrices in that subset (in this case the third), requiring only two bits rather than the four bits which would be required if fed back as an absolute index as one of the sixteen possible matrices in the whole set.

For the next adjacent frequency interval 14(2), the receiver may then determine that the subset of matrices corresponding to absolute indices 5, 9, 3 and 2 are most correlated with the precoding index of the second interval 14(1) (again these are preferably pre-computed and read from a look-up table). If the receiver also determines that the precoding matrix for transmission on the adjacent second frequency interval 14(2) is the matrix with an absolute index of 9 for example, then it can encode that index for feedback as a relative index as one of the four possible matrices in that next subset (in this case the second). This continues for successive frequency intervals, encoding the index of each frequency interval relative to the previous one. Alternatively or additionally, the differential encoding scheme can be used to encode the precoding matrices from one time interval to the next. Also, instead of encoding relative to the index of the first frequency interval 14(0), the indices could be encoded relative to a wideband PMI across the whole frequency band or a PMI for a part of a system band. This could also apply to encoding time intervals.

However, this differential encoding scheme may fail if the precoding matrix determined at any stage is not one of the most-correlated subset. This may be a particular problem if an error propagates from each successive differential encoding to the next.

A first embodiment of the invention provides a method for resetting the precoding feedback scheme based on differential encoding. The main drawback of the differential encoding schemes is error propagation. In this first embodiment, the receiver computes the transition probabilities, i.e., calculates the probability that the current channel precoding matrix index is j, knowing that the previous precoding matrix index is i. From these probabilities, the receiver can build, in parallel to the differential encoding subset, a subset of the most likely precoder transitions. Hence, if the differential subset deviates from the transition based subset, the differential encoder is reset. The reset can alternatively be implemented at fixed time intervals.

To build the transition based subset, the steady-state conditional probability defining the event that on the actual sub-band the optimal PMI is i knowing that the initial PMI is j is computed on the fly during the systems operation. Hence, one can determine what are the most likely transitions for each precoding matrix. As an example, these probabilities can be computed using a simple moving average finite impulse response (FIR) filter or an infinite impulse response (IIR) filter. From the computed probabilities, one can build the subset of the most likely precoder transitions to use for adjacent sub-bands.

A possibility for modelling the frequency correlation between the matrices is by using a Markov chain.

Note that the probability is a conditional probability, i.e. an outcome of a trial affects the probability of an outcome of a subsequent trial.

A second embodiment of the invention resorts to the above idea to build the subset of preferred precoding matrices to be used to compress the precoding information. In other words, the receiver computes the transition probabilities, i.e., the probability that the current channel precoding matrix index is j, knowing that the previous (in time) precoding matrix index is i. These transition probabilities are then used to determine the subset of precoding matrices that are more likely to be chosen as preferred precoding matrices after a given precoding matrix. The reduction of the original codebook to this subset of precoding matrices corresponds to a reduction of the number of bits required to signal the new precoding index.

With this scheme, the most likely precoding matrices in the future channel realization are determined for each precoding matrix from the steady-state transition probabilities. In an OFDM system, where the precoding matrix information needs to be sent with a specified frequency resolution, the same approach exploiting the correlation in the time domain can also be used to compress the precoding information in the frequency domain, where we compute the transition probabilities from a first frequency interval to a second frequency interval. In this case, the computation of the transition probabilities can be performed jointly or separately in time and in frequency, and the accumulation of data to compute the time-frequency transition probabilities can be performed based on the same or on different filter parameters in time and frequency.

As an example, the calculation of the time-frequency transition probabilities can be performed based on a filter for each precoding matrix index. Consider a MIMO system, where the user equipment is required to feed back precoding information relative to a codebook of size L, over a system bandwidth containing N frequency intervals. Consider the case where we separately compute the transition probabilities in the frequency domain. In this case, for each precoding matrix index i, i=1, . . . , L, the user equipment accumulates data on the probability that the preferred channel precoding matrix index on a certain frequency interval is j, j=1, . . . , L, knowing that the preferred precoding index on the preceding (adjacent) frequency interval is i. This can be implemented by observing the index transitions and updating the transition probabilities $P_{j,i}$ as $$P_{j,i} = (1-\alpha) \cdot P_{j,i} + \alpha \cdot \delta$$

where $\alpha$ is a positive constant, $0 \leq \alpha < 1$, and $$\delta = \begin{cases} 1 & \text{if the transition } i \to j \text{ has occurred} \\ 0 & \text{if the transition } i \to j \text{ has not occurred} \end{cases}.$$

Notice that $\alpha$ could be optimized separately for frequency correlation case or time correlation case depending on the coherence time or the coherence bandwidth of the channel and the speed of convergence desired.

In a third embodiment, the receiver 4 may signal to the transmitter 2 the specific subsets that the receiver intends to use for PMI compression. As discussed above, the receiver determines a subset of matrices in order to encode the PMI as one of that subset, thus compressing the PMI information because it requires fewer bits to encode than if encoded as one of the whole set. In embodiments of the present invention, this subset could be the most-correlated subset or the most-probable subset (i.e. the transition based subset).

In prior systems, compression is performed using the most-correlated subset and it requires both the transmitter and the receiver to pre-compute the correlation (based on the known codebook) so that the transmitter knows how to decode the compressed PMI indication fed back from the receiver. However, there is a problem with this in that the requirement for total pre-computation makes the system unable to follow the actual current channel characteristics, and thus is less accurate. Computing the correlation implies not being able to exploit the short-term channel conditions.

The third embodiment of the present invention solves this problem by transmitting an indication of the subset to be used for compression from the receiver to the transmitter. The transmitter then uses the indication of this subset in the decoding of compressed precoding matrix indices. At first, this might seem completely contrary to the idea of compression, since transmitting the subset increases overhead. However, the third embodiment of the present invention derives from the realization that the selected compression subset need only be reported back relatively infrequently to have a significant benefit in terms of following channel characteristics to improve accuracy. The subset need only be reported to the transmitter once in many frames. For example, considering rough orders-of-magnitude, a frame is of the order of 1 ms whereas channel conditions may typically change over a matter of seconds. Thus the extra signaling overhead incurred by reporting the compression subset need only be minimal, but it provides a substantial benefit because the compression computation performed at the transmitter need not be based on a long term average over all channels but instead can be refreshed in line with changes in channel conditions and can be performed specially in relation to the channel in question.

The subset could be reported as part of the PMI report or any other suitable control signaling mechanism.

Note that this third embodiment need not necessarily make use of the most-probable transmission based subset, although it may do. For instance the compression subset may be found by computing one subset for each matrix index based on the transition probabilities as in the second embodiment, or based on the most correlated subset, or based on a different computation altogether. If based on the correlation subset, the differential encoding scheme may include a reset mechanism, such as using the most-probable transition subset as in the first embodiment, or may not do.

In a fourth embodiment, the receiver 4 indicates to the transmitter 2 the preferred size of the codebook subset to be used for PMI compression. This has the advantage again of making the system more flexible to channel conditions. If the size was not reported by the receiver, the transmitter would simply have to have predetermined knowledge of a fixed subset size, whereas if the size is reported by the receiver then the subset size can vary depending on channel conditions.

Again, this indication could be transmitted from the receiver to the transmitter as part of the PMI report or by means of another control signalling mechanism. Also, as an example of order-of-magnitude, it may need only be transmitted perhaps once every few seconds (compared with a frame length of the order of 1 ms).

The feature of transmitting the size of the preferred subset from the transmitter can be used independently of any of the first, second or third embodiments or in conjunction with any of the first, second and/or third embodiments. For example, it may be used in conjunction with the signalling of the codebook subset as in the third embodiment.

Figure 4:
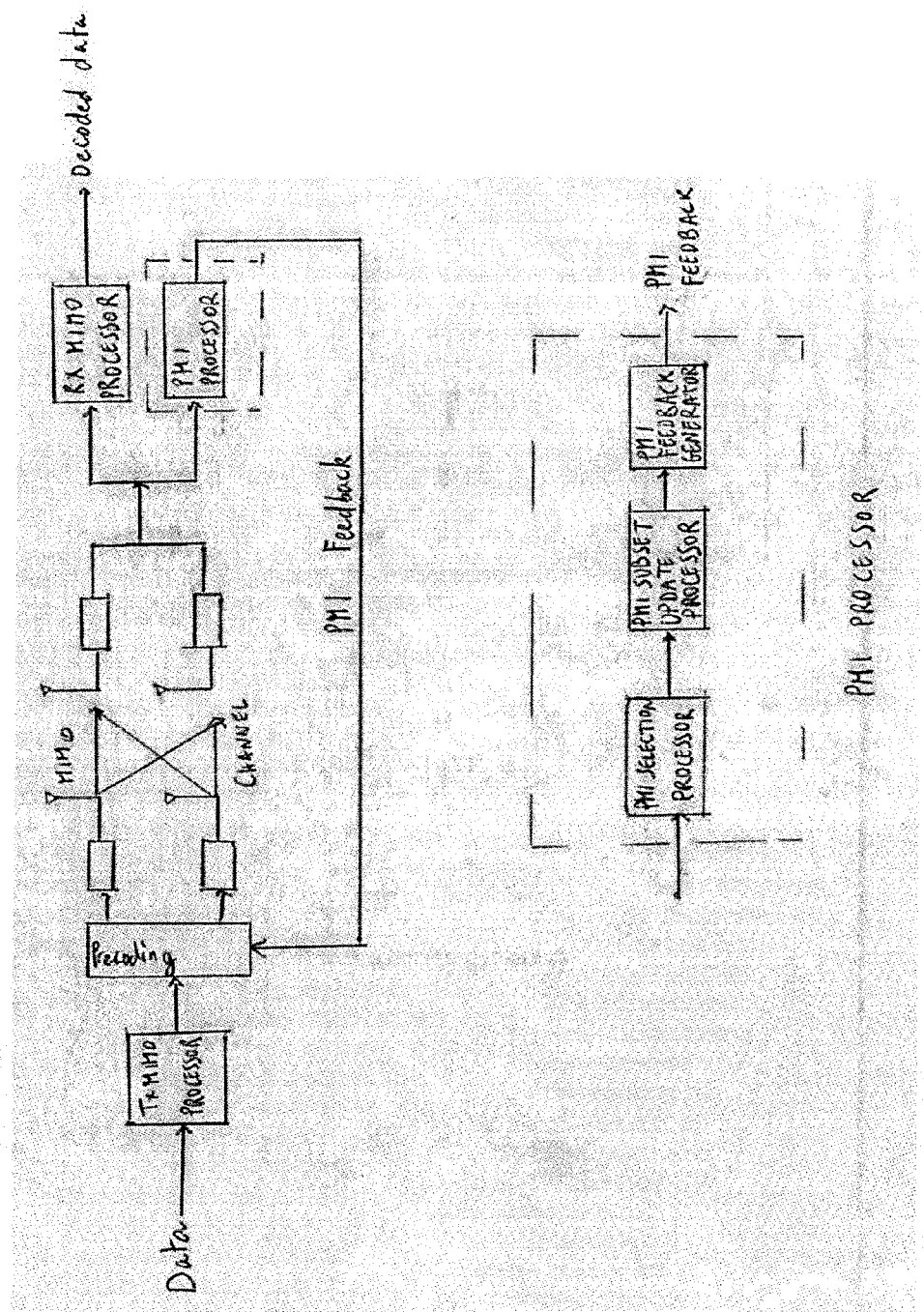
FIG. 4 is a schematic block diagram of a circuit for calculation of the PMI feedback.

The transmission and feedback schemes described above are preferably implemented in software running on processors of the transmitter and receiver as appropriate. An overall schematic block diagram for the PMI feedback schemes is given in FIG. 4.

In the above embodiments, the differential encoding scheme involves encoding a PMI for a frequency interval or time interval relative to some subset of PMIs derived based on another frequency interval or time interval, e.g. sending the index with respect to a preferred subset or a most-probable subset. For example, if the PMI of interval 14(1) is encoded relative to interval 14(0), and the PMI of interval 14(2) is encoded relative to interval 14(1), and so on.

However, in a fifth embodiment, instead of the receiver 4 transmitting the PMI of each interval (e.g. intervals 14(0) . . . 14(N)) relative to each preceding interval in the series or sequence, it instead encodes the PMI of each interval relative to a PMI for a relevant bandwidth. This relevant bandwidth could be the whole system bandwidth, as mentioned above, or it could be a part of the whole system bandwidth. It could be the whole bandwidth possible for the channel, or could be only the part of the band available or desired for transmission at any given time. In the case differential encoding relative to a partial band, the part of the band used could be chosen or determined in any way. But in one example, the user equipment (UE) splits the band into bandwidth parts, typically two or three, relative to which it encodes the initial PMI. In another example, the base station (node B) signals a set S of subbands to the UE, and the UE transmits the initial PMI encoded relative to the single PMI for that set S. The subbands of the set S need not be contiguous. Indeed, more generally in the case of differential encoding relative to a partial "relevant" bandwidth, the partial band in question need not comprise contiguous frequency intervals, although it may do.

The meaning of the PMI for the relevant band, either whole or part of the system band, is the PMI that the receiver 4 would prefer for the transmitter 2 to use (according to some suitable performance criterion or criteria such as throughput or mean square error) if it were to transmit to the receiver 2 over the whole or part of the system band in question. So in the case of the whole band, it is the PMI that would be preferred if the transmitter were to transmit over the entire band (the wideband PMI). And in the case of a partial band, it is the PMI that would be preferred if the transmitter were to transmit over only that part of the band.

In the fifth embodiment, the receiver 4 uses the relevant band PMI for the encoding by deriving the most probable subset relative to the relevant band PMI, instead of from each preceding frequency interval or time interval in the series or sequence. That is, the receiver 4 calculates for each relevant band PMI index i what are the transition probabilities that an interval will require a PMI index j, and thus determines a most-probable subset for any interval based on a given relevant band PMI. Aside from the use if the relevant band PMI instead of preceding PMI, the most-probable subset is determined and used as in the second embodiment.

So for example the PMI of the first interval 14(0) is encoded relative to the most probable subset derived from the relevant band PMI, the PMI of second interval 14(1) is also encoded relative to that same most probable subset, as is the PMI of the third interval 14(2), and so forth.

In a sixth embodiment, only an initial PMI of a first interval in a series or sequence could be encoded relative to the whole or partial system band PMI. So for example, the PMI of interval 14(1) could be encoded relative to interval 14(0), and the PMI of interval 14(2) encoded relative to interval 14(1), and so on; but instead of the receiver 4 transmitting the initial PMI of the first interval 14(0) as an "absolute" index relative to the whole codebook, it could instead be encoded relative to a PMI for a given relevant bandwidth.

Similarly, if the scheme is reset, the first PMI transmitted following the reset may be transmitted encoded relative to a given relevant band PMI (either whole or part of the system band).

It will be appreciated that the above embodiments have been described only by way of example. For example, the above description refers in places to subset reduction in the frequency domain, the invention also applies to the case where the technique is adopted in the time domain (subset reduction from one reporting time to the next). That is, the technique is also valid in the time domain for the case of a single frequency interval, or both in the time and frequency domain. Further, particularly but not exclusively in the case of both, different calculation parameters, e.g. other than correlation, and possibly different subset sizes may be used. Other applications and configurations may also be apparent to the person skilled in the art given the disclosure herein. The scope of the invention is not limited by the described embodiments.

The invention claimed is:

1. A method of transmitting from a transmitter to a receiver over a wireless multiple-input-multiple-output channel comprising a series of frequency intervals, the method comprising:

based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and for each successive frequency interval in the series:
determining from said predetermined set of precoding matrices a preferred subset of precoding matrices based on a suitable metric computed with respect to the matrix determined for the previous frequency interval;

based on one or more performance criteria evaluated in relation to the previously received transmission, selecting at the receiver a respective precoding matrix from said predetermined set for transmitting from the transmitter to the receiver on said successive frequency interval; and feeding back an index of that respective precoding matrix from the receiver to the transmitter using a differential encoding scheme whereby the respective index is indicated relative to said preferred subset;

wherein the method further comprises resetting the differential encoding scheme upon detecting a condition; and one of:
(a) said condition comprises the condition that the selected precoding matrix is not in the preferred subset; or
(b) for each of said successive frequency intervals, the method comprises determining from said predetermined set, separately from the determination of said preferred subset, a subset of most-probable precoding matrices having some conditional probability of being selected for transmission from the transmitter to the receiver, the conditional probability being computed by accumulating data on previous observed transitions in the selected precoding matrix and being used to determine the subset, and said condition comprises the condition that the most-probable subset differs from the preferred subset by a predetermined amount.

2. The method of claim 1, wherein the determining based on said suitable metric comprises determining a subset of matrices from said predetermined set having the greatest correlation with the first matrix.

3. The method of claim 1, wherein for each frequency interval, the method comprises: transmitting from the transmitter to the receiver using the respective precoding matrix to transmit on said successive frequency interval.

4. The method of claim 1, wherein for each transmission, the method comprises feeding back an index of the first precoding matrix from the receiver to the transmitter, and transmitting from the transmitter to the receiver using the first precoding matrix to transmit on the first frequency interval.

5. The method according to claim 1, wherein the most-probable subsets are determined using one of: a finite impulse response filter, and an infinite impulse response filter.

6. The method of claim 1, wherein said resetting comprises replacing the preferred subset with the most-probable subset.

7. The method of claim 1, wherein said resetting comprises indicating the respective index relative to the whole of said predetermined set.

8. The method of claim 1, wherein said determination of said most-probable precoding matrices is based on calculation during system operation.

9. The method according to claim 1, such that the method is applied in both the time and frequency domains together.

10. A computer program product comprising code which, when executed by a processor, performs the method of claim 1.

11. A transceiver comprising multiple antennas and a processor programmed to perform the receiver steps or the transmitter steps of claim 1.

12. A wireless cellular communication system comprising the transceiver of claim 11.

13. A method of transmitting from a transmitter to a receiver over a wireless multiple-input-multiple-output channel comprising a series of frequency intervals, the method comprising:
- based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals;
- and for each successive frequency interval in the series:
  - determining, from said predetermined set of precoding matrices, a subset of precoding matrices;
- based on one or more performance criteria evaluated in relation to the previously received transmission, selecting at the receiver a respective precoding matrix from said predetermined set for transmission from the transmitter to the receiver on said successive frequency interval; and
  - feeding back an index of that respective precoding matrix from the receiver to the transmitter using a differential encoding scheme whereby the respective index is indicated relative to said subset of most-probable precoding matrices;
- wherein said subset for each successive time interval is a subset of most probable precoding matrices having a conditional probability of being selected for transmission from the transmitter to the receiver, the conditional probability being computed by accumulating data on previous observed transitions in the selected precoding matrix and being used to determine the subset.

14. The method according to claim 13, wherein said determination of said most-probable precoding matrices is based on calculation during system operation.

15. The method according to claim 13, such that the method is applied in both the time and frequency domains together.

16. A method of transmitting from a transmitter to a receiver over a wireless multiple-input-multiple-output channel comprising a series of frequency intervals, the method comprising:
- based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and
- for each successive frequency interval in the series:
- determining from said predetermined set of precoding matrices a preferred subset of precoding matrices;
- based on one or more performance criteria evaluated in relation to the previously received transmission, selecting at the receiver a respective precoding matrix from said predetermined set for transmitting from the transmitter to the receiver on said successive frequency interval; and
- feeding back an index of that respective precoding matrix from the receiver to the transmitter using a differential encoding scheme whereby the respective index is indicated relative to said preferred subset;
- wherein the method further comprises transmitting an indication of at least one of the preferred subsets from the receiver to the transmitter.

17. A method according to claim 16, such that the method is applied in both the time and frequency domains together.

18. A method of transmitting from a transmitter to a receiver over a wireless multiple-input-multiple-output channel comprising a series of frequency intervals, the method comprising:
- based on one or more performance criteria evaluated in relation to a previously received transmission from the transmitter, selecting at the receiver a first precoding matrix out of a predetermined set of precoding matrices for transmitting from the transmitter to the receiver on a first of said frequency intervals; and
- for each successive frequency interval in the series:
- determining from said predetermined set of precoding matrices a preferred subset of precoding matrices;
- based on one or more performance criteria evaluated in relation to the previously received transmission, selecting at the receiver a respective precoding matrix from said predetermined set for transmitting from the transmitter to the receiver on said successive frequency interval; and
- feeding back an index of that respective precoding matrix from the receiver to the transmitter using a differential encoding scheme whereby the respective index is indicated relative to said preferred subset;
- wherein the method further comprises transmitting the size of at least one of the preferred subsets from the receiver to the transmitter.

19. The method according to claim 18, such that the method is applied in both the time and frequency domains together.

20. A method of transmitting a sequence of transmissions at respective time intervals from a transmitter to a receiver over a wireless multiple-input-multiple-output channel comprising one or more frequency intervals, the method comprising:
- based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and
- for each successive time interval in the sequence:
- determining from said predetermined set of precoding matrices a preferred subset of precoding matrices based on a suitable metric computed with respect to the matrix determined for the previous time interval;
- based on one or more performance criteria evaluated in relation to the previously received transmission, selecting at the receiver a respective precoding matrix from said predetermined set for transmitting from the transmitter to the receiver on said successive time interval;
- feeding back an index of that respective precoding matrix from the receiver to the transmitter using a differential encoding scheme whereby the respective index is indicated relative to said preferred subset; and
- wherein the method further comprises resetting the differential encoding scheme upon detecting a condition; and one of:
  - (a) said condition comprises the condition that the selected precoding matrix is not in the preferred subset; or
  - (b) for each of said successive time intervals the method comprises: determining from said predetermined set, separately from the determination of said preferred subset, a subset of most-probable precoding matrices having some conditional probability of being selected for transmission from the transmitter to the receiver, the conditional probability being computed by accumulating data on previous observed transitions in the selected precoding matrix and being used to determine the subset, and said condition comprises the condition that the most-probable subset differs from the preferred subset by a predetermined amount.

21. The method of claim 20, wherein the determining based on said suitable metric comprises determining a subset of matrices from said predetermined set having the greatest correlation with the first matrix.

22. The method of claim 20, wherein for each time interval the method comprises transmitting from the transmitter to the receiver using the respective precoding matrix to transmit on said successive time interval.

23. The method of claim 20, wherein for each transmission the method comprises feeding back an index of the first precoding matrix from the receiver to the transmitter, and transmitting from the transmitter to the receiver using the first precoding matrix to transmit at the first time interval.

24. The method of claim 20, wherein said resetting comprises replacing the preferred subset with the most-probable subset.

25. The method of claim 20, wherein said resetting comprises indicating the respective index relative to the whole of said predetermined set.

26. The method of claim 20, wherein said determination of said most-probable precoding matrices is based on calculation during system operation.

27. The method according to claim 20, such that the method is applied in both the time and frequency domains together.

28. A method of transmitting a sequence of transmissions at respective time intervals from a transmitter to a receiver over a wireless multiple-input-multiple-output channel comprising one or more frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver at a first of said time intervals;
and for each successive time interval in the sequence:
determining, from said predetermined set of precoding matrices, a subset of precoding matrices;
based on one or more performance criteria evaluated in relation to the previously received transmission in the sequence, selecting at the receiver a respective precoding matrix from said predetermined set for transmission from the transmitter to the receiver on said successive time interval; and
feeding back an index of that respective precoding matrix from the receiver to the transmitter using a differential encoding scheme whereby the respective index is indicated relative to said subset of most-probable precoding matrices;
wherein said subset for each successive time interval is a subset of most probable precoding matrices having a conditional probability of being selected for transmission from the transmitter to the receiver, the conditional probability being computed by accumulating data on previous observed transitions in the selected precoding matrix and being used to determine the subset.

29. The method of claim 28, wherein said determination of said most-probable precoding matrices is based on calculation during system operation.

30. The method according to claim 28, such that the method is applied in both the time and frequency domains together.

31. A method of transmitting a sequence of transmissions at respective time intervals from a transmitter to a receiver over a wireless multiple-input-multiple-output channel comprising one or more frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and
for each successive time interval in the sequence:
determining from said predetermined set of precoding matrices a preferred subset of precoding matrices;
based on one or more performance criteria evaluated in relation to the previously received transmission, selecting at the receiver a respective precoding matrix from said predetermined set for transmitting from the transmitter to the receiver on said successive time interval; and
feeding back an index of that respective precoding matrix from the receiver to the transmitter using a differential encoding scheme whereby the respective index is indicated relative to said preferred subset;
wherein the method further comprises transmitting an indication of at least one of the preferred subsets from the receiver to the transmitter.

32. The method according to claim 31, such that the method is applied in both the time and frequency domains together.

33. A method of transmitting a sequence of transmissions at respective time intervals from a transmitter to a receiver over a wireless multiple-input-multiple-output channel comprising one or more frequency intervals, the method comprising:
based on one or more performance criteria evaluated in relation to a previously received transmission from the transmitter, selecting at the receiver a first precoding matrix out of a predetermined set of precoding matrices for transmitting from the transmitter to the receiver at a first of said time intervals; and
for each successive time interval in the sequence:
determining from said predetermined set of precoding matrices a preferred subset of precoding matrices;
based on one or more performance criteria evaluated in relation to the previously received transmission, selecting at the receiver a respective precoding matrix from said predetermined set for transmitting from the transmitter to the receiver on said successive time interval; and
feeding back an index of that respective precoding matrix from the receiver to the transmitter using a differential encoding scheme whereby the respective index is indicated relative to said preferred subset;
wherein the method further comprises transmitting the size of at least one of the preferred subsets from the receiver to the transmitter.

34. The method according to claim 33, such that the method is applied in both the time and frequency domains together.

* * * * *